Patented Dec. 29, 1953

2,664,427

UNITED STATES PATENT OFFICE 2,664,427

WATER-SOLUBLE α-ARYLAMINOANTHRA-QUINONE DERIVATIVES

David I. Randall, Easton, Pa., and Edgar E. Renfrew, Phillipsburg, N. J., assignors to General Aniline & Film Corporation, New York, N. Y., a corporation of Delaware No Drawing. Application February 10, 1950, Serial No. 143,599

10 Claims. (Cl. 260—380)

This invention relates to novel water-soluble compounds of the arylaminoanthraquinone series, which are valuable as dyestuffs, especially for printing cotton and similar cellulosic materials, and for coloring wood pulp; and to a process for preparing the same.

The compounds of this invention are quaternary nitrogen base salts and isothiouronium salts, obtained by reacting a tertiary nitrogen base or a thiourea with a chloromethyl-substituted arylaminoanthraquinone compound in which the chloromethyl groups occupy nuclear positions of the arylamino radicals, said parent chloromethyl-substituted compounds being of the type described in our copending application Serial No. 143,598, filed of even date herewith.

Preparation of the compounds of this invention is conveniently effected by heating the chloromethyl - substituted arylaminoanthraquinone compound of the aforesaid type with at least an equivalent amount of a thiourea or a tertiary nitrogen base at elevated temperatures, e. g. about 100° C., and separating the water-insoluble residue from the reaction mixture. If both reagents are solid at the reaction temperature, water can be added as a reaction medium to facilitate the reaction. The reaction results in the replacement of the chlorine in the nuclear chloromethyl radicals of the parent compounds by a quaternary nitrogen base salt radical or an isothiouronium salt radical, whereby the products are rendered soluble in water.

The compounds of this invention are anthraquinone mono- or poly-aminoaryl mono- or poly-methyl quaternary nitrogen base or isothiouronium salts, preferably containing no acidic salt-forming substituents, for example, sulfo or carboxy groups. The remaining positions of the anthraquinone nucleus can be unsubstituted or may contain other substituents such as hydroxyl, primary amino, lower alkylamino (e. g. methyl-amino, ethylamino), lower alkoxy (i. g. methoxy, ethoxy), lower alkyl (e. g. methyl, ethyl) groups, or halogen (e. g. chlorine, bromine). The aryl radicals of the amino aryl groups can be monocyclic radicals of the benzene series, or polycyclic radicals, e. g. of the naphthalene, biphenyl anthracene, phenanthrene or diphenyl methane series, but are preferably monocyclic. The remaining nuclear positions of said aryl radicals can be unsubstituted or can contain such substituents as lower alkyl (e. g. methyl, ethyl) groups, or halogen (e. g. chlorine, bromine).

The tertiary nitrogen bases forming the quaternary nitrogen base salts of this invention can be, for example, pyridine, the picolines, quinoline, isoquinoline, trimethylamine, triethylamine, diethylaminoethyl alcohol, or benzyl diethylamine. Suitable thioureas for formation of the isothiouronium salts of the invention are, for example, thiourea, 1-methyl-, 1-phenyl-, 1-allyl-, 1,3-dimethyl-, 1,3-ethylene-, 1,1,3-trimethyl-, and 1,1,3,3-tetramethylthiourea. Quaternary nitrogen base salt radicals have the formula -N(tert.)-X, wherein N(tert.) represents the radical of a tertiary amine, and X represents a salt-forming anion such as chlorine. The isothiouronium salt radical has the formula

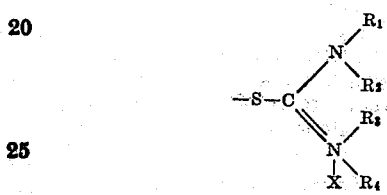

wherein the R's represent hydrogen or hydrocarbon groups attached to nitrogen in the parent thiourea, and X represents a salt-forming anion such as chlorine.

The compounds of this invention can be applied in printing pastes to cotton fiber, whereby they yield bright, full shades of good fastness to washing and chlorine. They are highly substantive to paper pulp and when applied for coloration of this material, they possess excellent fastness to bleeding. They are also useful in the preparation of aqueous writing inks.

Preparation of representative compounds of this invention is illustrated in the following examples, wherein parts are by weight unless otherwise expressed.

Example 1

50 parts of 1-(bis-chloromethyl-p-toluidino)-anthraquinone, which can be prepared according to Example 1 of our aforesaid copending application, were mixed with 500 parts of 1,1,3-trimethyl-thiourea and 250 parts of water, and the mixture heated at about 100° C., while allowing the water to evaporate. The semi-solid residue was slurried with 1500 parts of acetone, to dissolve unreacted 1,1,3-trimethyl-thiourea, and the insoluble reaction product recovered by filtration from the slurry. The filter cake, on air drying, amounted to 54 parts and constituted the bis - 1,1,3 - trimethyl-thiouronium chloride corresponding to the 1-(bis-chloromethyl-p-toluidino)-anthraquinone, initially employed, wherein the chlorine of the chloromethyl groups was replaced by the isothiouronium chloride radical. The product was water-soluble, and yielded rose shades when printed on cotton, having good fastness properties. Paper pulp was likewise colored in rose shades, and evidenced remarkable resistance to bleeding.

Example 2

The procedure of Example 1 was repeated, except that an equivalent amount of 1,3-dimethyl-thiourea was substituted for 1,1,3-trimethyl-thiourea. The properties of the product obtained were similar to those of the product of Example 1. The product in this case was the bis-1,3-dimethyl-thiouronium chloride corresponding to 1-(bis-chloromethyl - p - toluidino)-anthraquinone initially employed.

Example 3

The procedure of Example 1 was repeated, except that an equivalent amount of ethylene thiourea was substituted for the 1,1,3-trimethyl-thiourea employed in the aforesaid example. The product obtained yielded colorations similar to those of the product of Example 1. The product obtained in this case was the bis-ethylene-thiouronium chloride corresponding to 1-(bis-chloromethyl-p-toluidino)-anthraquinone initially employed.

Example 4

50 parts of 1-(bis-chloromethyl-p-toluidino)-anthraquinone were mixed with 100 parts of pyridine, and the resulting solution evaporated at a temperature of about 100° C., whereby a dry powder was obtained. This product was freely soluble in water and yielded prints on cotton and colorations on wood pulp, similar to those obtained in Example 1. The product was the bis-pyridonium chloride corresponding to 1-(bis-chloromethyl-p-toluidino)-anthraquinone employed as the starting material.

Example 5

50 parts of 1-(mono-chloromethyl-anilino)-4-hydroxyanthraquinone, which can be obtained according to Example 2 of our copending application above identified, 50 parts of 1,1,3-trimethyl-thiourea and 375 parts of water were mixed and warmed at a temperature of about 100° C., allowing the water to evaporate. The product was obtained in the form of a stiff paste which was freely soluble in acetone and water. It yielded bluish-violet prints on cotton, of good fastness properties, dyed cellulose acetate in bright bluish-violet shades of good fastness to light and washing, and excellent fastness to gas fading, with excellent exhaust. The product likewise produced a strong coloration on paper pulp, having excellent fastness properties, especially fastness to bleeding. The product was the mono-1,1,3-trimethyl-thiouronium chloride corresponding to 1-(mono-chloromethyl-anilino)-4-hydroxyanthraquinone initially used.

Example 6

50 parts of 4-(mono - chloromethyl - p - toluidino)-1-hydroxyanthraquinone, which can be obtained in accordance with Example 3 of our aforesaid copending application, 50 parts of 1,1,3-trimethyl-thiourea and 550 parts of water were mixed and warmed at a temperature of about 100° C., allowing the water to evaporate. The residue was slurried with 700 parts of acetone to dissolve excess 1,1,3-trimethyl-thiourea, and the slurry filtered. The filter cake was mixed with a second portion of 700 parts of acetone, and again recovered from the resulting slurry by filtration, and air-dried. When printed on cotton, the product thus obtained yielded attractive bluish-violet shades of good fastness properties. The product likewise dyed paper in shades having excellent resistance to bleeding. The product of this example is the mono-1,1,3-trimethyl-thiouronium chloride corresponding to 4-(mono-chloromethyl-p-toluidino)-1-hydroxyanthraquinone used as the starting material.

Example 7

50 parts of 1,4-bis-(monochloromethyl-p-toluidino)-anthraquinone, which can be prepared according to Example 4 of our aforesaid copending application, 50 parts of 1,1,3-trimethyl-thiourea and 160 parts of water were mixed and warmed at about 100° C., allowing the water to evaporate until a smooth paste was obtained. The paste was slurried with 600 parts of acetone, and the resulting slurry filtered. The filter cake was air-dried, yielding a product which produced attractive green prints on cotton, and yielded similar colorations on paper, having good fastness properties. The product thus obtained was the bis-1,1,3-trimethyl-thiouronium chloride corresponding to 1,4-bis(mono-chloromethyl-p-toluidino)-anthraquinone initially employed.

Example 8

The procedure of Example 7 was repeated, except that a similar amount of 1,5-bis-(monochloromethyl-p-toluidino)-anthraquinone, which can be prepared according to Example 5 of our aforesaid copending application, was substituted for the 1,4- isomer thereof, employed in the preceding example. The product obtained was the bis-1,1,3-trimethyl - thiouronium chloride corresponding to 1,5-bis-(mono-chloromethyl-p-toluidino)-anthraquinone, and yielded cotton prints and paper dyeings of reddish-violet shades having good fastness properties.

Example 9

12 parts of 1-methylamino-4-(mono-chloromethyl-p-toluidino)-anthraquinone, which can be prepared according to Example 6 of our aforesaid copending application, 5 parts of 1,1,3-trimethyl-thiourea and 25 parts of water were thoroughly mixed and heated at about 100° C., for 15 minutes. The smooth paste thus obtained was slurried with 100 parts of acetone, and the acetone solution decanted from the oily residue. The latter residue was dried in a vacuum oven at 50° C. for 15 hours, yielding a glassy solid which was ground to a powder. This product was water-soluble, yielding greenish-blue prints on cotton, of good fastness properties, especially to washing, and similar colorations on paper, which were fast to bleeding. The product obtained was the mono-1,1,3-trimethyl-thiouronium chloride corresponding to the 1-methylamino-4-(mono-chloromethyl - p - toluidino)-anthraquinone initially used.

Example 10

10 parts of 1-amino-2-bromo-4-(mono-chloromethyl-p-toluidino)-anthraquinone, which can be prepared according to Example 7 of our aforesaid copending application, 10 parts of 1,1,3-trimethyl-thiourea and 25 parts of water were mixed and heated at about 100° C. for ½ hour. The smooth paste thus obtained was slurried with 500 parts of acetone. The resulting suspension was filtered, and the insoluble filter cake airdried. The product was soluble in water, yielding prints on cotton of a blue shade having good fastness properties, and dyed paper in similar shades of excellent fastness to bleeding. The product obtained was the mono-1,1,3-trimethyl-thiouronium chloride corresponding to 1-amino-2-bromo-4-(mono-chloromethyl-p-toluidino)-anthraquinone initially employed.

In carrying out the reaction of the chloromethyl-substituted α-arylaminoanthraquinone compounds with a tertiary nitrogen base or a thiourea, as illustrated in the foregoing examples, water can be used as a reaction medium, especially if both of the reagents are solids, to facilitate the reaction. In general, at least one of the reagents should be present in a liquid phase. When one of the reagents is a liquid such as pyridine or triethylamine, an excess of the nitrogen base can be used as the reaction medium. When an excess of the tertiary nitrogen base or of the thiourea is used, the unreacted portion thereof can be removed from the reaction mixture by appropriate treatment, such as evaporation in the case of volatile compounds such as pyridine, or extraction with an organic solvent for the reagent present in excess, in which the reaction product is insoluble. In most cases, acetone can be used for this purpose. When a stoichiometrical amount of the nitrogen base or thiourea compound is employed, extraction with acetone or similar solvents is generally unnecessary to obtain the product in satisfactorily pure form.

A reaction temperature of about 100° C., illustrated in the foregoing examples, is chosen as convenient. However, temperatures from 70 to 150° C. can generally be employed.

The position of the chloromethyl groups in the α-arylamino radicals of the starting materials is determined by other substituents present therein. Ordinarily, the chloromethyl group occupies a position meta to the anthraquinonylamino group, since the latter has a meta-directing influence in the acid medium employed for chloromethylation of the corresponding α-arylaminoanthraquinone compounds. Thus, in the p-toluidino radicals and the anilino radical of the compounds employed as starting materials in the foregoing examples, the chloromethyl group is apparently meta to the amino group, and hence, the methyl quaternary nitrogen base or isothiouronium salt radicals occupy the same positions in the resulting products.

Instead of the chloromethyl-substituted arylaminoanthraquinones serving as intermediates in the foregoing examples, other nuclear chloromethyl-substituted arylaminoanthraquinone compounds can be used, wherein the chloromethyl-substituted anilino and p-toluidino radicals of the starting materials of the examples are replaced by other chloromethyl-substituted arylamino groups, e. g. by chloromethyl-substituted -m-xylidino, -p-chloroanilino, -α- or -β-naphthylamino, -p-benzylanilino, or p-phenylanilino radicals. Similarly, instead of pyridine, other tertiary nitrogen bases such as the picolines, quinoline, isoquinoline, trimethylamine, triethylamine, benzyl diethylamine and triethylaminoethyl alcohol can be used. Instead of the thioureas of the examples, there can be used equivalent amounts of 1-methyl-, 1-allyl-, 1-phenyl-, or 1,1,3,3-tetramethyl-thiourea.

The products obtained according to the examples or variations hereinbefore mentioned, are in each case water-soluble, and yield bright colorations on cellulosic materials such as cotton and wood pulp, said colorations having good fastness properties, especially to light, washing or bleeding.

Variations and modifications which will be obvious to those skilled in the art can be made in the foregoing processes and compositions, without departing from the scope or spirit of the invention.

We claim:

1. A compound having the general formula

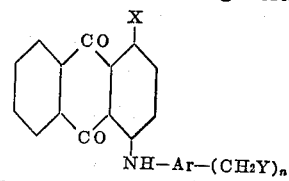

NH—Ar—(CH₂Y)ₙ wherein X represents a member of the group consisting of hydrogen, hydroxyl, and methylamino, Ar represents a monocyclic aryl hydrocarbon radical in which the —NH— and —CH₂Y radicals are nuclear substituents, (CH₂Y) is a radical of the group consisting of methylene quaternary nitrogen base salts, and methylene isothiouronium salts, and $n$ is an integer from 1 to 2.

2. A process for preparing a water-soluble anthraquinone dyestuff, which comprises heating a member of the class consisting of a tertiary nitrogen base and a thiourea with a chloromethylated arylaminoanthraquinone having the following general formula

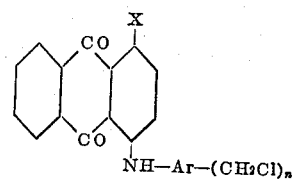

NH—Ar—(CH₂Cl)ₙ wherein X represents a member of the group consisting of hydrogen, hydroxyl, and methylamino, Ar represents a monocyclic aryl hydrocarbon radical in which the —NH— and CH₂Y are nuclear substituents, and $n$ is an integer from 1 to 2.

3. 1-(α-anthraquinonylamino) - 4 - methylbenzene - 3,5 - bis-[methyl - (1',1',3' - trimethyl-isothiouronium)-chloride].

4. 1 - (4' - hydroxy - 1' - anthraquinonylamino) - benzene - 3 - methyl - (1'',1'',3'' - trimethyl - isothiouronium) - chloride.

5. 1 - (4' - hydroxy - 1' - anthraquinonylamino) - 4 - methylbenzene - 3 - methyl - (1'',1'',3'' - trimethyl - isothiouronium) - chloride.

6. 1 - (1' - methylamino - 4' - anthraquinonylamino) - 4 - methylbenzene - 3 - methyl - (1'',1'',3'' - trimethyl - isothiouronium) - chloride.

7. A process as defined in claim 2, wherein the chloromethyl - substituted α - arylaminoanthraquinone compound is 1-(bis-chloromethyl-p-toluidino)-anthraquinone.

8. A process as defined in claim 2, wherein the chloromethyl - substituted α - arylaminoanthraquinone compound is 1 - (monochloromethylanilino)-4-hydroxyanthraquinone.

9. A process as defined in claim 2, wherein the chloromethyl - substituted α - arylaminoanthraquinone compound is 4-(monochloromethyl-p-toluidino)-1-hydroxyanthraquinone.

10. A process as defined in claim 2, wherein the chloromethyl - substituted α - arylaminoanthraquinone compound is 1-methylamino-4-(monochloromethyl-p-toluidino)-anthraquinone.

DAVID I. RANDALL.
EDGAR E. RENFREW.

References Cited in the file of this patent

UNITED STATES PATENTS

| Number | Name | Date |
|---|---|---|
| 2,189,720 | Watt | Feb. 6, 1940 |
| 2,270,893 | Orthner et al. | Jan. 27, 1942 |
| 2,317,999 | Leuchs | May 4, 1943 |
| 2,544,825 | Coffey et al. | Mar. 13, 1951 |

FOREIGN PATENTS

| Number | Country | Date |
|---|---|---|
| 613,980 | Great Britain | Dec. 7, 1948 |